Nov. 20, 1962 J. A. CHURCHILL 3,064,981

SOUND REPRODUCING MACHINES

Filed Dec. 14, 1959 3 Sheets-Sheet 1

INVENTOR
JOHN ADRIAN CHURCHILL
BY MAXWELL E. SPARROW
ATTORNEY

INVENTOR
JOHN ADRIAN CHURCHILL
BY
MAXWELL E. SPARROW
ATTORNEY

Nov. 20, 1962 J. A. CHURCHILL 3,064,981

SOUND REPRODUCING MACHINES

Filed Dec. 14, 1959 3 Sheets-Sheet 3

INVENTOR
JOHN ADRIAN CHURCHILL
BY MAXWELL E. SPARROW
ATTORNEY

United States Patent Office 3,064,981

Patented Nov. 20, 1962

3,064,981

SOUND REPRODUCING MACHINES

John Adrian Churchill, London, England, assignor to Foster-Mallard Limited, London, England Filed Dec. 14, 1959, Ser. No. 859,411

5 Claims. (Cl. 274—10)

This invention relates to sound reproducing machines of the kind in which grooved disc-shaped records are used in association with a pick-up device including a stylus which runs in the grooves of the records, means being provided for supporting a plurality of records in an upper position above a turntable and dropping them one-by-one on to the turntable, the recording on the upper side of each record being played after the record has dropped. The invention is more particularly, but not exclusively, concerned with sound reproducing machines of that kind in which the recording on the underside of each record can be played before the record is dropped on to the turntable, and the main objects of the invention are to provide means for ensuring good concentricity of the lowermost record on the supporting means and accurate control of the instant at which each record falls.

According to the present invention, record releasing mechanism for a sound reproducing machine of the kind referred to comprises in combination with a spindle extending upwardly from the centre of the turntable and rotatable therewith which spindle has upper and lower portions both concentric with the turntable, and an intermediate portion oblique to the axis of the turntable so as to provide an offset shoulder at the lower end of the upper concentric portion, the upper portion being cut away on the side opposite to the shoulder to allow records sufficient lateral movement to pass over the shoulder; a record release finger movable in a slot in the intermediate portion of the spindle to displace laterally a record resting on the shoulder, a keeper slidable on a slot in the upper concentric portion of the spindle and normally extending downwardly far enough to engage in the central hole of a record resting on the shoulder, and co-operating camming surfaces on the release finger and keeper acting to lift the said keeper during initial movement of the release finger to allow a record so resting to move laterally off the shoulder.

The record release finger is preferably so shaped that a record, after being released from the shoulder by said finger, is supported by a part of the finger until the finger is retracted, so that the instant of dropping is determined by the retraction of the finger.

The release finger may be formed with a lateral bulge below and projecting laterally beyond a record displacing surface thereon so that a record, when moved off the shoulder by said record displacing surface, falls on to said bulge and is supported thereby until the finger is retracted.

The record release finger may be pivotally mounted in the slot in the intermediate portion of the spindle and is rocked about its pivot by movement of a stem slidable axially in a bore in the spindle, the stem co-operating with a cam slot in the finger.

The invention is hereinafter described with reference to the accompanying drawings in which.

Figure 1:
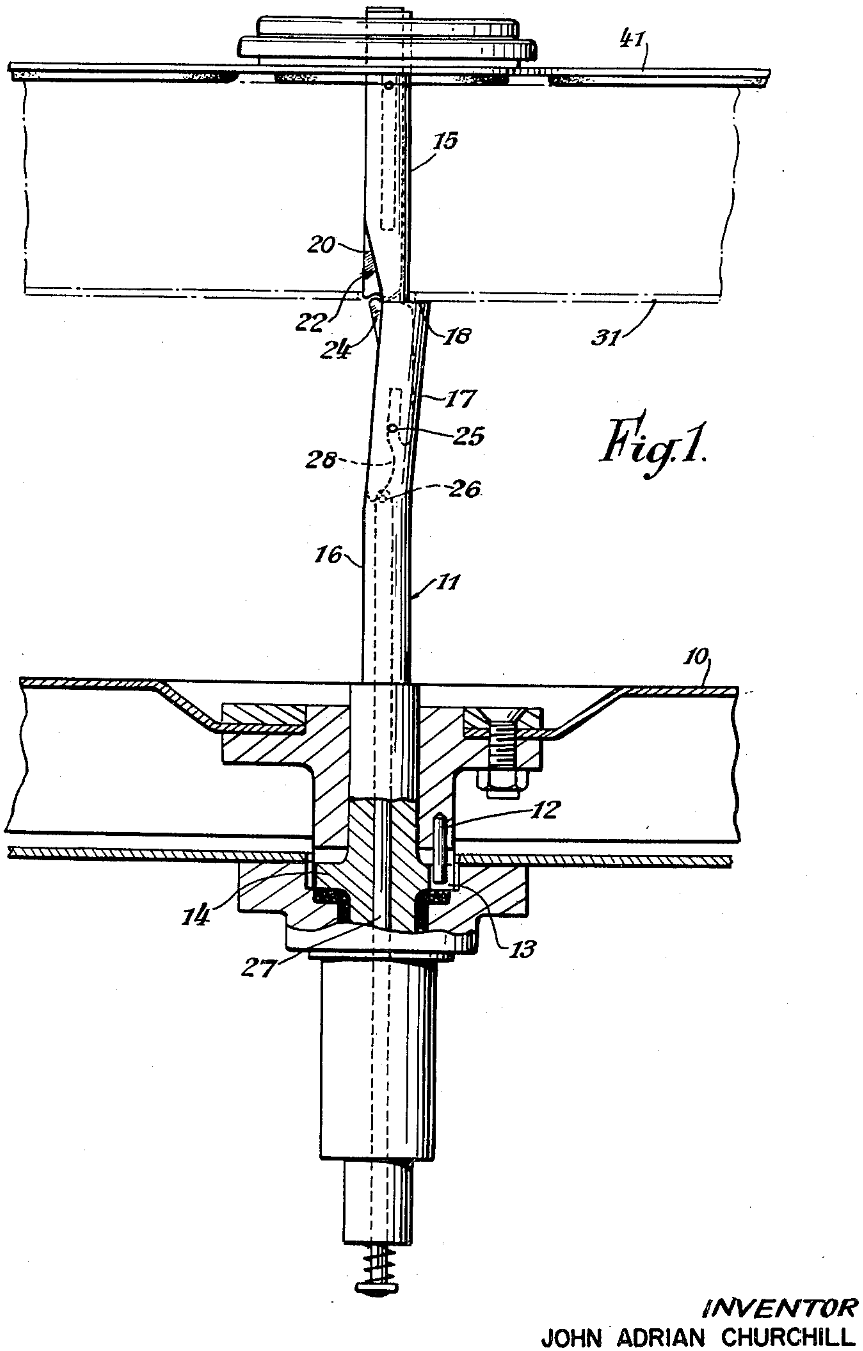
FIGURE 1 is a sectional view of one form of record releasing mechanism according to the invention.

Referring to the drawings, the turntable 10 of a sound reproducing machine of the kind referred to has upstanding from the centre thereof a spindle 11. The spindle rotates with the turntable, the latter being driven by a friction wheel engaging a rim thereon in the usual manner, and the turntable carrying a pin 12, eccentric to its axis, which engages a notch 13 in a flange 14 on the spindle 11, the spindle being mounted in bearings on the machine.

The spindle 11, above the turntable 10, has upper and lower portions 15 and 16 respectively both of which are concentric with the turntable and are spaced apart by an intermediate portion 17 extending obliquely outwardly and upwardly from the upper end of the portion 16 so as to provide, at the junction of its upper end with the upper portion 15, a laterally offset shoulder 18.

On the side opposite to the said shoulder 18, the upper concentric portion 15 is radially slotted at 19 to receive a parallel-sided keeper 20 urged downwardly by a coiled compression spring 21 the said upper concentric portion 15 being cut away obliquely at 22 on the slotted side to meet the upper end of the intermediate portion 17 and allow, when the keeper 20 is lifted, lateral movement of a record resting on the shoulder 18 to clear the said shoulder.

The intermediate portion 17 of the spindle is slotted diametrically at 23 to receive a record release finger 24 mounted on a pivot pin 25 extending across the slot 23, the finger 24 being movable about the pivot pin by an operating pin 26 on the upper end of a stem 27 slidable in the lower portion 16 of the spindle, the pin cooperating with a cam edge 28 on the record release finger.

At its upper end the record release finger 24 has, on one side, a substantially vertical surface 29 adapted to engage the side of the central hole in a record 31 resting on the shoulder 18 and, as the record release finger rocks, it moves the said record 31 off the shoulder, the record release finger having an outward bulge 32 below the vertical surface 29 which protrudes beyond the edge of the shoulder 18 when the vertical surface 29 is in line with that edge. The upper edge of the record release finger is formed with a cam lobe 33 co-operating with a profile 34 on the lower end of the keeper 20 to lift the latter as the record release finger 24 moves in the record-releasing direction, such lifting being completed before the vertical surface 29 engages the record.

The record release finger 24 is slotted longitudinally at 35 to receive its pivot pin 25, being urged upwardly by a coiled compression spring 36 to retain the pin 25 normally in the lower end of the slot, and the operating pin 26 on the stem 27 is held in contact with the cam edge 28 on the record release finger by a blade spring 37 attached to the finger and pressing on the pin. The blade spring 37 may be attached to the finger, as shown, by forming on it an elongated eye 38 which fits in the slot 35 in the record release finger 24 and surrounds the pivot pin 25 and spring 36.

Records 31, 39, 40 are shown as being supported on the shoulder 18, and it will be understood that any number of such records up to, for example, ten, can be so supported. They are held in a horizontal position by an upper turntable 41 resting on the uppermost record and guided in any suitable manner to prevent tilting, the said upper turntable having rotation transmitted thereto by the keeper 20 acting as a key in co-operation with a keyway in the said upper turntable.

The stem 27 which actuates the record release finger 24 is moved upwardly by suitable mechanism when a record is to be released, such mechanism being brought into operation at the required times by a control unit driven by an electric motor which also drives the turntable 10, the control unit being caused to make a cycle of movement after the playing of each record side by means responsive to the movement of the pick-up arm.

Figure 2:
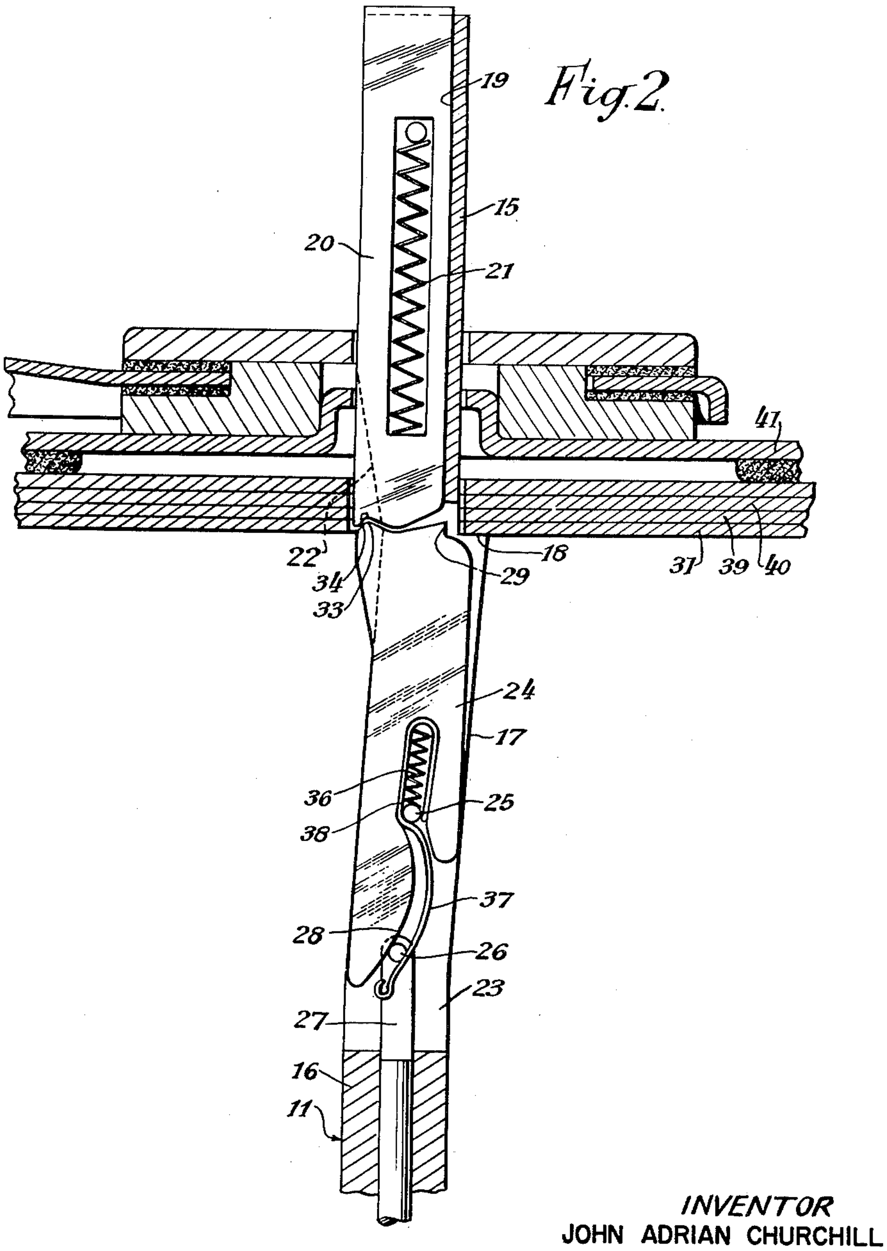
FIGURE 2 is a view similar to part of FIGURE 1 but on a larger scale.
Figure 3:
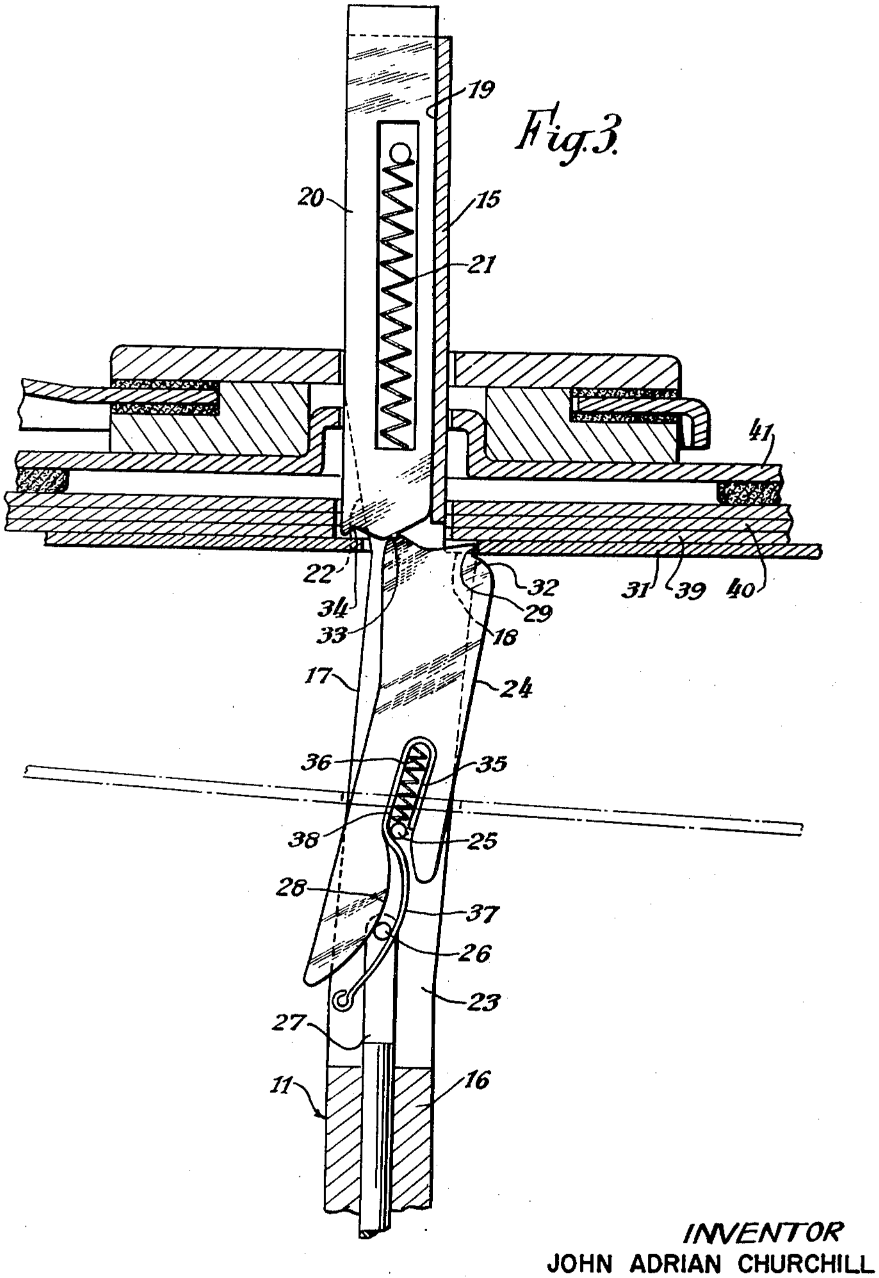
FIGURE 3 is a view similar to FIGURE 2 but showing the parts in another position.

Assuming that a stack of records is placed on the spindle, the lowermost one (31 in the drawing) rests on the shoulder 18, and is held concentric with the spindle 11 by the lower end of the keeper 20 (FIGURES 1 and 2). When the record 31 is to be released, the record release finger 24 is caused to rock, first lifting the keeper 20 clear of the lowermost record 31 and then moving that record laterally off the shoulder 18 as shown in FIGURE 3. At the completion of the movement of the finger 24 in this direction the record is clear of the shoulder 18 but is resting on the bulge on the said finger, and only when the record release finger commences its return movement is the record 31 free to drop on to the turntable 10. A record falling on to the turntable is shown in chain-dotted lines in FIGURE 3.

The next record 39 above that which is released is held against lateral movement by the keeper 20 and, when the first record 31 falls, rests on the top of the finger 24 above the vertical surface 29, pushing the finger 24 downwardly by its weight until it rests on the shoulder 18. When the record release finger returns, and the vertical surface 29 thereon clears the edge of the hole in this next record, the said finger springs upwardly into its normal position.

Instead of the spindle 11 being mounted in bearings in the machine and supporting the turntable, the turntable may be mounted in bearings in the machine, the spindle being removable upwardly therefrom and being driven from the turntable by a key or other suitable means. In order to avoid lifting of the spindle by the record-releasing mechanism, the shape of the cam edge 28 is modified to enable the required rocking motion to be produced by downward movement of the pin 26, and the stem 27 is pulled downwardly instead of being pushed upwardly by the cooperating mechanism associated with the control unit.

The machine may include provision for playing the recording on the underside of each record before the latter is dropped on to the turntable, using an upwardly-projecting stylus on the pick-up. For that purpose, the concentricity of the lowermost record in the position above the turntable is of considerable importance.

I claim:

1. In a record releasing mechanism for a sound reproducing machine, having a spindle extending upwardly from the center of the turntable of said machine and rotatable therewith; said spindle having an upper portion and a lower portion concentric with said turntable and having an intermediate portion oblique to the axis of said turntable, said oblique portion providing an offset shoulder at the lower end of said upper portion, said intermediate portion having a longitudinal slot, said upper portion having a slot and being cut away on the side opposite to said shoulder to allow records a sufficient lateral movement to pass over said shoulder, a record release finger pivotally mounted in said slot in said intermediate portion of said spindle for displacing laterally a record resting on said shoulder, a keeper slidable in said slot in said upper portion of said spindle and normally extending downwardly far enough for engaging in the central hole of a record resting on said shoulder, and cooperating camming surfaces on both said release finger and said keeper acting to lift said keeper during the initial movement of said release finger to allow a record resting on said shoulder to move thereoff.

2. In a record releasing mechanism according to claim 1, said record releasing finger having means for supporting a record after said record has been released from said shoulder by said finger until said finger is retracted, so that the instant of dropping of said record is determined by the retraction of said finger.

3. In a record release mechanism according to claim 1, said record release finger having a slot extending upwardly of said pivotal mounting and having resilient spring means in said slot for keeping said cooperating camming surfaces on both said release finger and said keeper in positive contact with one another.

4. In a record releasing mechanism according to claim 1, said record releasing finger having a record displacing surface and a lateral bulge below said displacing surface and projecting beyond the latter, said bulge supporting a record being moved off said shoulder by said displacing surface until said release finger is retracted.

5. In a record releasing mechanism according to claim 4, said lower portion of said spindle having a central bore, an axially displaceable stem in said bore, and a cam edge on said record release finger operatingly engaged by said stem for pivotally rocking said finger.

References Cited in the file of this patent

UNITED STATES PATENTS

| | | |
|---|---|---|
| 2,498,333 | Faulkner | Feb. 21, 1950 |
| 2,621,932 | Knox | Dec. 16, 1952 |
| 2,641,474 | Zandelin | June 9, 1953 |
| 2,873,977 | Manning | Feb. 17, 1959 |
| 2,919,924 | Wilton | Jan. 5, 1960 |
| 2,921,794 | Menke | Jan. 19, 1960 |

FOREIGN PATENTS

| | | |
|---|---|---|
| 849,014 | Germany | Sept. 11, 1952 |
| 212,390 | Australia | Jan. 8, 1958 |